Figure 7:
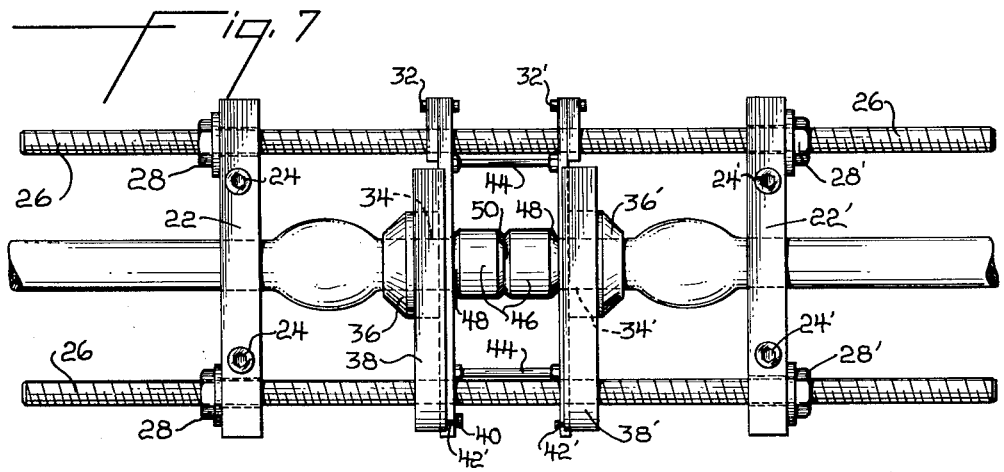

July 17, 1962 W. F. BROSKE 3,044,334
WIRE TOOL
Filed Dec. 31, 1958 3 Sheets-Sheet 1
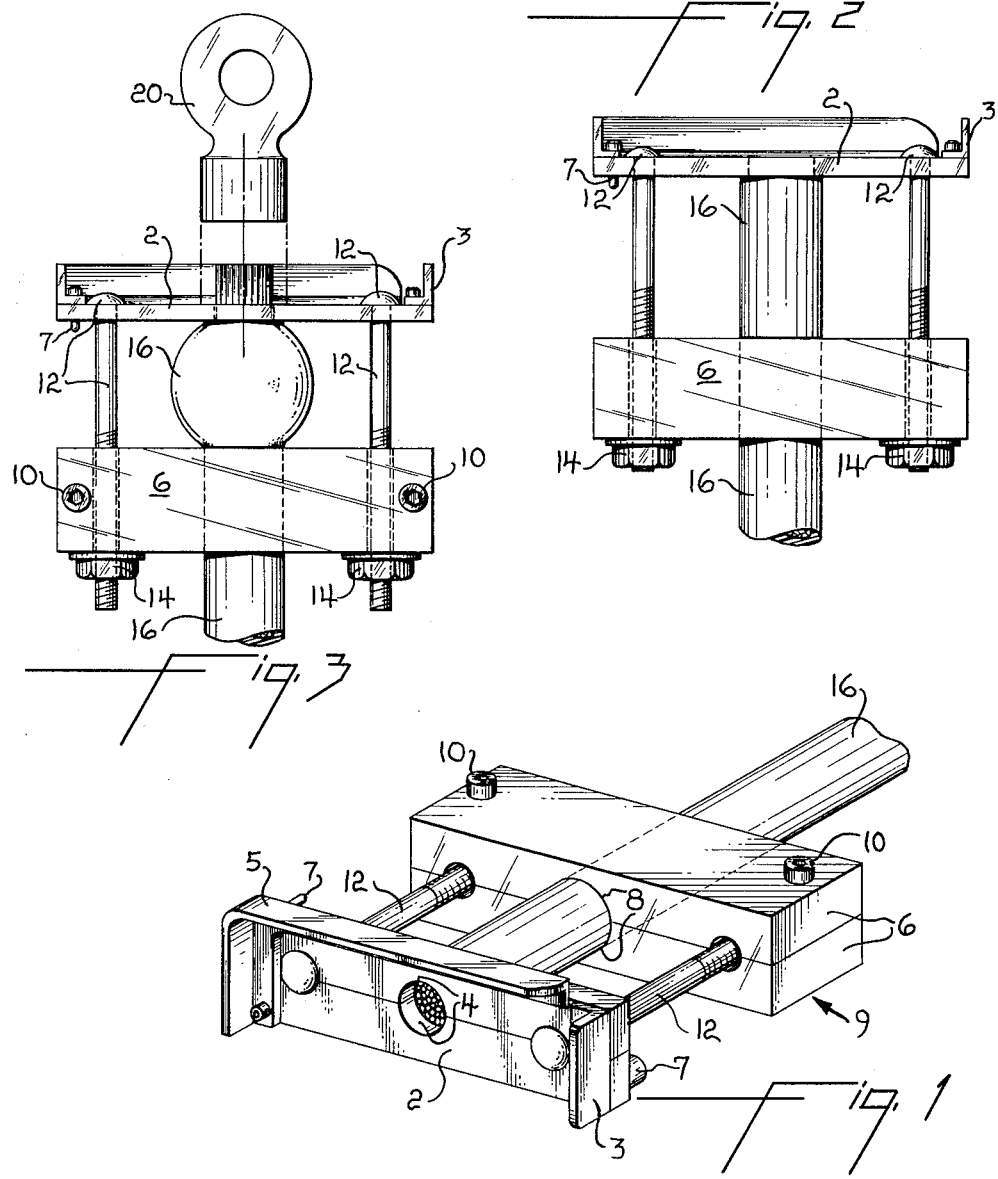
INVENTOR.
William P. Broske
BY
lentzi, morris + Safford July 17, 1962 W. F. BROSKE 3,044,334
WIRE TOOL Filed Dec. 31, 1958 3 Sheets-Sheet 2

INVENTOR.
William F. Broske
BY
*leurtis, morris + lafford*

July 17, 1962 W. F. BROSKE 3,044,334
WIRE TOOL
Filed Dec. 31, 1959 3 Sheets-Sheet 3
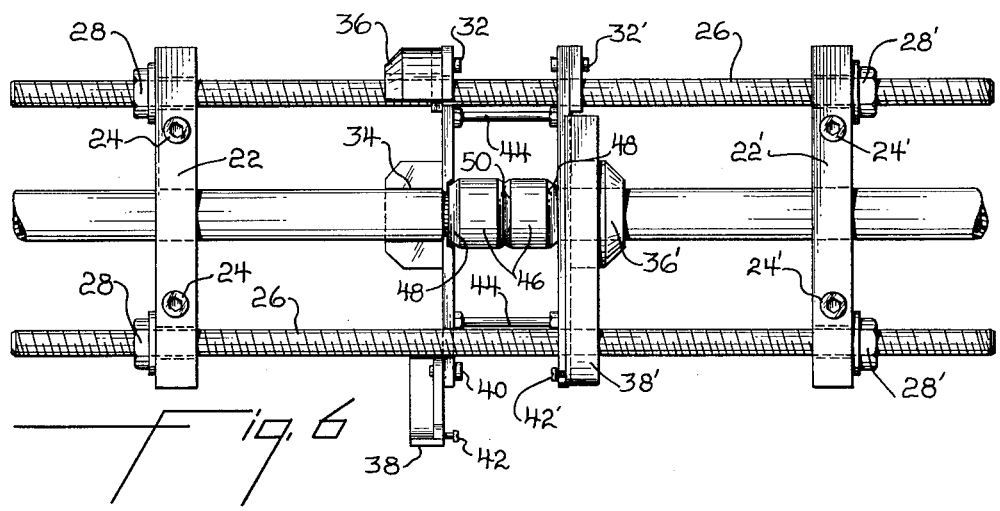
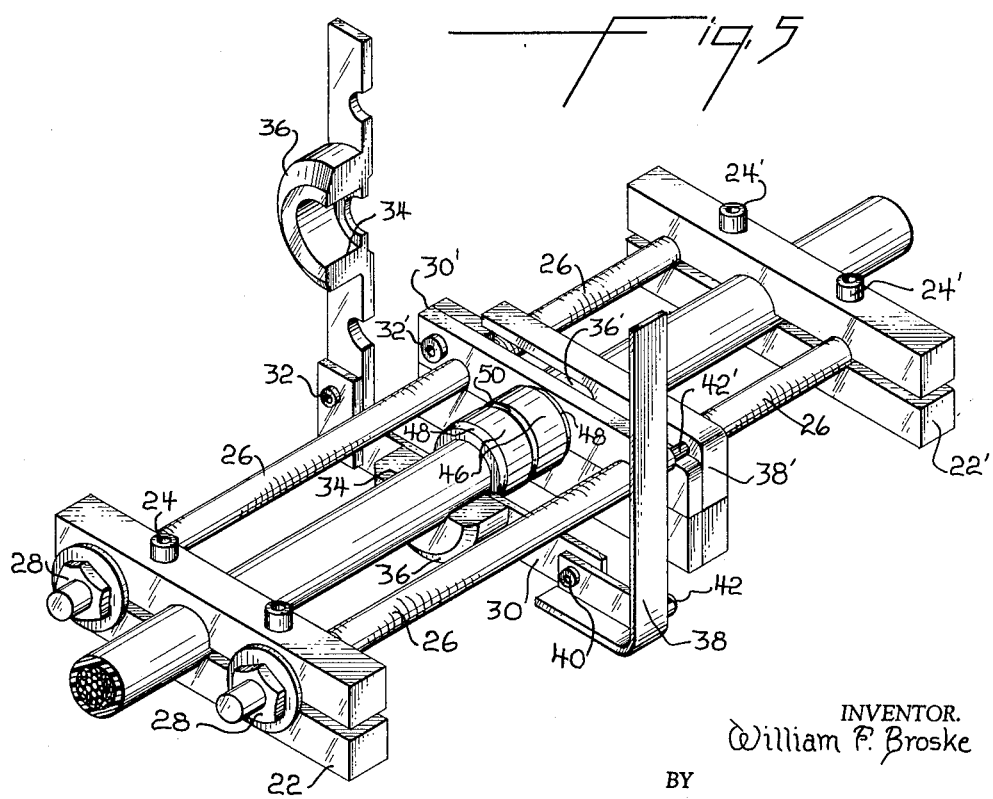
INVENTOR.
William F. Broske
BY
Curtis, Morris & Safford

United States Patent Office 3,044,334
Patented July 17, 1962

3,044,334
WIRE TOOL
William F. Broske, Camp Hill, Pa., assignor to AMP Incorporated, Harrisburg, Pa.
Filed Dec. 31, 1958, Ser. No. 784,249
3 Claims. (Cl. 81—9.51)

This invention relates to apparatus for exposing the conducting core of an insulated cable or wire in order to permit attachment of a terminal or connector thereto or for other purposes. The invention is herein described with particular reference to relatively heavy gauge cables of the type which are usually multistranded and provided with a relatively thick, tough, covering of rubber or other flexible elastomeric insulating material. Cables of this type are commonly used where a high current capacity conductor is required which must be flexed during usage and which must be capable of withstanding mechanical abrasion or wear. Such conditions exist in the case of electric welding equipment, movable electrically powered materials handling devices, and portable electrically powered tools.

Since it is a desideratum of such cables that the insulating covering be extremely tough, mechanically strong, and resistant to abrasion, it follows that the intentional removal of insulation poses a difficult problem. These tough rubbery types of insulation resist cutting unless an extremely sharp cutting edge is employed. Furthermore, if it is desired to remove, say two inches of insulation from the end of a cable, and the insulation is circumferentially cut to separate the end portion thereof from the length of the wire, the cut section of insulation quite often can not be removed by merely sliding it over and off of the conducting core since the cable is usually manufactured with the insulation in constrictive embracing relationship with the core. In the past it has been common to remove insulation or to expose the end of the core of a wire or cable of this type by cutting both circumferentially and longitudinally but this is a time consuming and difficult operation. Furthermore, it is often necessary that when such cables are spliced, the splice must be insulated after it has been made and this has frequently been done by vulcanizing new insulating material over the exposed and spliced strands of the two cables.

It is an object of the present invention to provide an improved apparatus for exposing the conducting core of an insulated conductor. It is a further object to provide an apparatus by means of which the conducting core of the cable can be temporarily exposed for purposes of terminating or splicing, and then recovered with the original insulation of the cable. A still further object of the invention is to provide an improved apparatus for facilitating the splicing of insulated conductors.

These and other objects of the invention are achieved in one embodiment which provides a plate and a cable clamp, the plate having an aperture therein which is sufficiently large to permit the core of the conductor to pass therethrough but which is not sufficiently large to permit passage of the insulation of the conductor so that when the conductor is positioned against the plate with the core in alignment with the opening, the cut face of the insulation bears against the surface of the plate. The clamp and plate are secured together in spaced-apart relationship and means are provided for moving these two parts relatively towards each other so that upon such movement, the section of insulation extending between the clamp and plate is gathered and compressed and the conducting core of the cable passes relatively through the aperture in the plate and is exposed for purposes of termination or splicing or for other purposes. After the desired operation has been performed, the clamp and plate are removed from the cable and the compressed insulation will tend to creep back to its original position to cover the splice or a portion of the terminal which has been attached to the end of the conducting core. According to a second embodiment of the invention, a pair of cable clamps are provided which are movable relatively towards and away from each other and between these clamps there are provided a pair of plates which are fixed in spaced apart relationship, each having an aperture through which the conducting core of the conductors may pass. Each of the clamps is secured or clamped to one conductor and the clamps are moved relatively towards each other to simultaneously expose the conducting cores of the two cables. When these conducting cores are thus exposed, they can be spliced or joined by any convenient splicing means.

Figure 8:
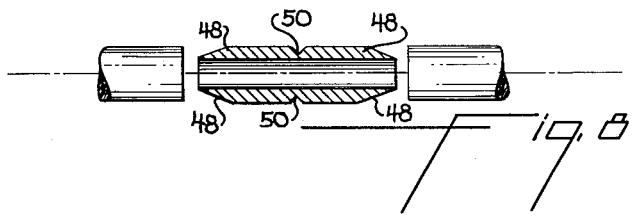
Figure 9:
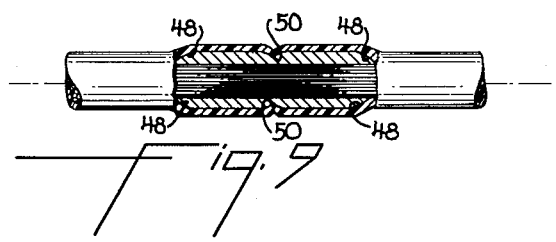
Figure 4:
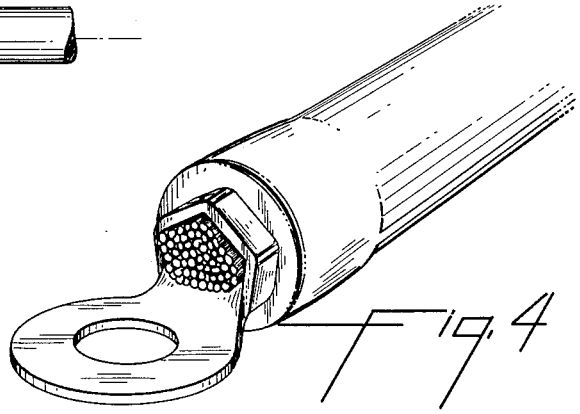

In the drawing:
FIGURE 1 is a perspective view of one type of tool in accordance with the invention for exposing conducting core at the end of an insulated conductor;
FIGURE 2 is a plan view of the embodiment of FIGURE 1;
FIGURE 3 is a view similar to FIGURE 2 but showing the relative positions of the parts and the insulation of the cable after the core has been exposed;
FIGURE 4 is a perspective view of a cable having a terminal crimped to the end thereof;
FIGURE 5 is a perspective view of an alternative embodiment of the invention adapted for splicing two cables;
FIGURE 6 is a plan view of the embodiment of FIGURE 5;
FIGURE 7 is a view similar to FIGURE 6 but showing the parts in the relative positions they occupy after the ends of the cables have been exposed;
FIGURE 8 is a fragmentary view showing a connector and the ends of a pair of conductors which are to be joined; and
FIGURE 9 is a view showing a connection between two cables made in accordance with the invention.

The embodiment of FIGURE 1 comprises a plate 2 which is advantageously composed of two sections hinged together at 3. Each section provides a semicircular notch 4 so that a generally circular aperture is formed when the plates are against each other. The diameter of this aperture should be sufficient to permit passage of the conducting core of the cable or wire but should be insufficient to permit passage of the insulation thereof. A bracket 5, having a pin 7 extending from the corner thereof, is hinged to one of the plate sections in order to clamp them together during use. A pair of bolts 12 having nuts 14 on their ends, pass freely through semicircular notches in plate 2 and freely through similar notches in the two halves 6 of a cable clamp generally indicated at 9. Each of the two parts of the clamp provides a semicylindrical notch 8 and the two halves are secured together by means of set screws 10 so that the cable 16 can be securely clamped upon tightening of these screws. Where the invention is being practiced with the relatively heavy gauge cable insulated with tough relatively thick rubbery insulation as shown in FIGURE 1, clamp 6 should be sufficiently strong tightly to grip the conductor so that the core and the insulation cannot move relative to each other. In other words, the insulation should be radially compressed, by the clamp, around the metal core so that the insulation can be axially compressed towards the clamp causing movement of either the core or the insulation past the clamped zone.

In use, clamp 9 is opened to permit positioning of the cable 16 between grooves 8 with its end against plate 2. When the cable is so positioned, its conducting core will be in axial alignment with the aperture formed by the cutout portions 4 of the plate and the cut end of the insulation of the cable will bear against the surface of the plate. The clamp is then tightened onto the cable and the nuts 14 are rotated to draw this clamp relatively towards the plate. Referring to FIGURE 3, upon such movement of the clamp, the section of insulation contained between the plate and the clamp is axially compressed and bulged and the core passes through aperture 4 until its end portion is exposed. With the core end exposed as shown in FIGURE 3, a terminal 20 can be secured thereto by crimping or by any other desired method or any other desired operation can be performed on this end. The plate can then be removed from the cable end by releasing clamping bracket 5 and swinging the plate halves apart. Upon removal of the clamp and plate from the cable, the bulged section of insulation will tend to creep upwardly as viewed in FIGURE 3 and cover the ferrule of the terminal so that the original insulation of the cable is employed to insulate the newly formed termination on the end thereof as shown in FIGURE 4.

It will be apparent that in order to expose the end of the core as illustrated in FIGURES 2 and 3 the section of the cable which extends between the clamp and the plate must remain substantially straight when the load is initially applied by rotating nuts 14. The distance between the plate and clamp should therefore be kept to a minimum which permits the exposure of the desired length of the core.

FIGURE 5 shows an alternative embodiment of the invention which comprises a pair of split clamps 22, 22' similar to the clamp 9 of FIGURE 1, each clamp having set screws 24, 24' to draw two halves together when the cable is clamped. A pair of elongated threaded rods 26 extend freely through the clamps and freely through apertures in a pair of split plates 30, 30' similar to plate 2. Nuts 28, 28' on the end of these threaded rods are provided to permit the clamps to be drawn towards each other during use. The plates 30, 30' are hinged as shown at 32, 32' and each plate section provides a semicircular cut out 34, 34' to define a circular opening which is large enough to permit passage of the conducting cores of the cables. Advantageously, collars 36, 36' are welded or otherwise secured to the plate parts to assist in aligning and supporting the cable adjacent the ends thereof. L-shaped clamping bars 38, 38' are pivotally secured at 40, 40' to one plate of each pair and pins 42, 42' extend from the arm of these bars in order that the two plate sections will be cammed together as the bars are swung over the plate sections. The two plates are rigidly connected by means of bolts 44 and are maintained in a fixed spaced apart relationship to each other by these bolts during use of the tool.

In use, where it is desired to splice a pair of insulated cables, a cylindrical ferrule 46 is positioned between the two plates 30, 30' and the plate halves are closed. Advantageously, a shoulder is provided on each aperture to receive the ends of this ferrule in order that it will be held in place during the use of the tool. The clamps 22, 22' are next engaged with the conductor and the nuts 28, 28' are rotated thereby to draw the two clamps relatively towards each other although it will be understood the plates maintain their same relative position during the operation. During such movement of the clamps, the insulation sections extending between the clamps and the plates on each side are bulged and compressed as described above, and the conducting cores of the cables pass through the apertures in the plates and into the ferrule 46. After a sufficient length of the core has been exposed and extends beyond the plates into the ferrule, the ferrule is crimped onto each of the conducting cores and the clamps and plates are removed from the spliced cable. Again, the insulation which has been pushed back and compressed will tend to creep to its former position and cover the ferrule thereby to insulate the joint. In order to facilitate the creepage of the insulation, it is desirable to bevel the ferrule at its end as shown at 48 and to provide a circumferential groove 50 intermediate its ends. The insulation, as it creeps back, tends to flow or creep downwardly into this groove until the edges meet. If desired, a suitable sealing compound can be applied at the joint and over the edges of the sections of insulation.

Alternative embodiments of the invention will be apparent from the foregoing descriptions. For example, some heavy gauge cables are provided in a form having two or more conducting cores. The exposure of the cores of cables of this type can be accomplished if the bearing plate is provided with several apertures, one for each conducting core. The invention is also applicable to many relatively light gauge wires and has been practiced successfully with wires in the size range of about A.W.G. #16 to 20. Depending upon the mechanical properties of the insulation and the wire, it has been found that under some circumstances it is preferable that the plate which pushes against the insulation should be moved relatively rapidly towards the clamped or supported section of the conductor to avoid flexure or buckling of the section of wire between the support and the insulation pushing member. For these smaller sizes of wires, the clamping member and the insulation pushing member can be incorporated into a hand tool if desired having a plier type or functionally similar means for moving the parts together.

I claim:

1. Means for exposing the metallic core of an insulated conductor comprising a plate having an aperture therein of a diameter greater than the diameter of said core and less than the diameter of the insulation on said conductor, a clamp for firmly clamping said insulated conductor in a manner such as to prevent relative movement between said core and said insulation, and means connecting said plate and said clamp for moving said plate and clamp relatively towards each other and for retaining said clamp and plate in their moved positions thereby to displace the portion of said insulation between said plate and said clamp relatively towards said clamp and to bulge said insulation portion and to expose said conductor core.

2. A device for splicing the conducting cores of a pair of insulated conductors having insulation extending substantially to their ends comprising, a pair of plates secured together in parallel spaced apart relationship, said plates having aligned apertures of a size sufficient to permit passage of said cores therethrough but insufficient to permit the insulation of said conductors to pass, a pair of conductor clamps oriented parallel to each other and parallel to said plates with said plates disposed between said clamps whereby each of said plates is associated with one of said clamps, and means for moving said clamps relatively towards their respective plates while maintaining a constant spacing between said plates whereby, the portions of said insulation between each plate and its associated clamp are bunched and gathered while a portion of the core of each conductor is displaced relatively through the aperture of its respective plate thereby to permit splicing of the ends of said cores.

3. Means for exposing the metallic core of a relatively large size conductor having a relatively heavy rubber-like insulating sheath comprising, a clamp for tightly clamping said conductor at a point adjacent its end and compressing said insulating sheath in the clamped zone thereby to prevent, in said clamped zone, relative movement between said metallic core and said sheath, sheath pushing means having surface portions engageable with the end face of said sheath but not engageable with the end face of said core, and means connecting said clamp and said sheath pushing means for moving said clamp and pushing means relatively towards each other thereby to bulge the portion of insulating sheath therebetween and to expose the end of said core and means for holding said sheath pushing means in said clamp after relative movement of said members towards each other thereby to permit attachment of a connector onto the exposed end of said core.

References Cited in the file of this patent

UNITED STATES PATENTS

| | | |
|---|---|---|
| 1,874,216 | Andren | Aug. 30, 1932 |
| 2,478,082 | Broske | Aug. 2, 1949 |
| 2,692,422 | Pierce | Oct. 26, 1954 |
| 2,703,026 | Basile et al. | Mar. 1, 1955 |
| 2,715,764 | Pierce | Aug. 23, 1955 |
| 2,765,685 | Stratman et al. | Oct. 9, 1956 |
| 2,774,810 | Ritter | Dec. 18, 1956 |
| 2,929,285 | Gulemi | Mar. 22, 1960 |

FOREIGN PATENTS

| | | |
|---|---|---|
| 641,067 | Great Britain | Aug. 2, 1950 |